United States Patent [19]

Bristow

[11] 4,045,789
[45] Aug. 30, 1977

[54] ANIMATED VIDEO IMAGE DISPLAY SYSTEM AND METHOD

[75] Inventor: Stephen D. Bristow, San Jose, Calif.

[73] Assignee: Atari, Inc., Sunnyvale, Calif.

[21] Appl. No.: 626,664

[22] Filed: Oct. 29, 1975

[51] Int. Cl.² ............... H04N 7/02; G06K 15/20
[52] U.S. Cl. ................ 340/324 AD; 273/DIG. 28
[58] Field of Search ............. 340/324 AD, 324 A; 178/DIG. 6; 360/14

[56] References Cited

U.S. PATENT DOCUMENTS

| 3,025,344 | 3/1962 | Bosustow | 360/14 |
| 3,721,757 | 3/1973 | Ettlinger | 360/14 |
| 3,723,803 | 3/1973 | Harrison et al. | 340/324 A |
| 3,747,087 | 7/1973 | Harrison et al. | 340/324 AD |
| 3,793,483 | 2/1974 | Bushnell | 340/324 AD |
| 3,824,336 | 7/1974 | Gould et al. | 360/14 |
| 3,891,982 | 6/1975 | Cheek et al. | 340/324 AD |
| 3,911,419 | 10/1975 | Bates et al. | 340/324 AD |

Primary Examiner—David L. Trafton
Attorney, Agent, or Firm—Flehr, Hohbach, Test, Albritton & Herbert

[57] ABSTRACT

System and method for producing an animated image of a moving object on a video display screen wherein digital data for a plurality of progressively different images of the object is stored in a memory and read out during successive frames of the picture. The data from the memory is combined with data corresponding to the position at which the image of each frame is to be displayed on the screen, and the images are displayed in accordance with the combined image and location data.

17 Claims, 2 Drawing Figures

ANIMATED VIDEO IMAGE DISPLAY SYSTEM AND METHOD

BACKGROUND OF THE INVENTION

This invention pertains generally to the display of video images and more particularly to a system and method for producing an animated display of a moving object on a video display screen.

Heretofore, electronic video amusement games have been provided in which images of unanimated objects such as balls and bats are caused to move about on the screen on a video display tube under the control of an operator or in response to control signals generated by circuitry within the game. There have been some attempts to display images of animated objects, such as men or animals walking or birds flying, utilizing relatively expensive computers to generate the successive images to be displayed.

SUMMARY AND OBJECTS OF THE INVENTION

In the system and method of the invention, digital data for a plurality of progressively different images of the object is stored in a read-only-memory (ROM) and read out during successive frames of the picture. The data from the memory is combined with data corresponding to the position at which the image for each frame is to be displayed on the screen, and the images are displayed in accordance with the combined image and location data.

It is in general an object of the invention to provide a new and improved system and method for producing an animated image of a moving object on a video display screen.

Another object of the invention is to provide a system and method of the above character in which data for successive images of the object is stored in a read-only-memory.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
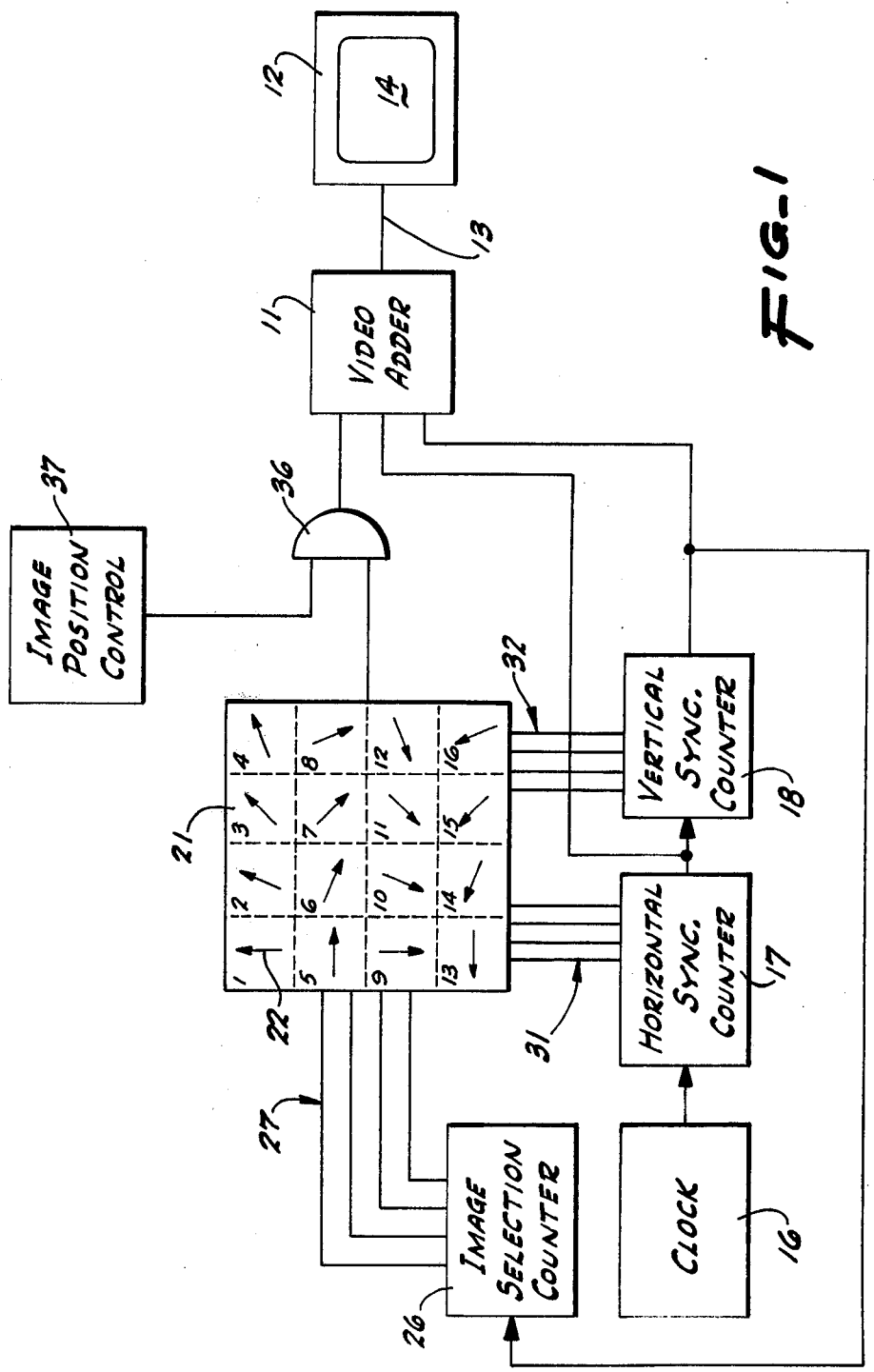
FIG. 1 is a block diagram of one embodiment of a system for producing an animated image of an object on a video display screen.

The system illustrated in FIG. 1 includes a video adder 11 and a video display tube 12, with the output of the adder connected to the tube by a line 13. The video adder is of a known design and serves to combine information signals with horizontal sync pulses and vertical sync pulses to provide a composite video signal on line 13. The display tube is likewise of known design, and it includes a luminescent display screen 14 which is scanned in horizontal and vertical directions by an electron beam to provide a raster on which successive frames of a picture can be displayed.

Horizontal and vertical sync pulses are provided by a sync generator comprising a clock 16, a horizontal sync counter 17, and a vertical sync counter 18. Clock 16 is of known design for producing clock pulses at a suitable predetermined rate, such as 7 MHz. Counters 17 and 18 are likewise of known design, and in the preferred embodiment they are divide-by-256 binary counters. As illustrated, the output of clock 16 is connected to the clock input of horizontal sync counter 17, and the overflow output of this counter is connected to the horizontal sync input of adder 11 and to the clock input of vertical sync counter 18. The overflow output of counter 18 is connected to the vertical sync input of the video adder.

The horizontal and vertical sync pulses applied to adder 11 serve to control the movement of the beam in the display tube in a known manner wherein the beam traverses the screen repeatedly along successive horizontal lines. In the preferred embodiment, there are 256 lines per frame. The count provided by counter 18 corresponds to the line being scanned, and the count provided by counter 17 corresponds to the horizontal position of the beam along the line.

Data for a plurality of progressively different images of an object to be displayed on screen 14 is stored in digital form in a read-only-memory (ROM) 21. The data for each image is stored at a separately addressable location in the ROM, and the data bits for each image can be addressed individually. In the embodiment illustrated, data for 16 images of an arrow 22 is stored at locations 1-16. For a ROM having a capacity of 4096 bits, for example, 256 bits are provided for each of the 16 images, and the bits for each image are arranged in 16 lines of 16 bits each.

Means is provided for applying image selection signals to ROM 22 for selecting the data for the image to be displayed during each frame of the picture. This means includes an image selector 26, which in the embodiment illustrated comprises a conventional binary counter having weighted output lines 27 connected to the image selection inputs of the ROM. In this embodiment, clock pulses are applied to counter 26 at the rate of 1 pulse per frame from the overflow output of vertical sync counter 18, and a new image is selected for each frame of the picture. However, the images do not have to be changed at the same rate as the frames, and counter 26 can be driven at a different rate or even asynchronously, if desired.

Means is also provided for applying address signals to ROM 21 for reading out the data for a selected image. For this purpose, the weighted output lines 31, 32 of counters 17, 18 are connected to the horizontal and vertical address lines of the ROM. Thus, the data in the ROM is addressed in step with the movement of the electron beam of the display tube.

The output of ROM 21 is connected to one input of an AND gate 36, and the output of this gate is connected to the information signal input of video adder 11. Gate 36 receives a second or enabling input from an image position control 37 which can, for example, be of the type described in U.S. Pat. No. 3,793,483, issued Jan. 19, 1974, or the type described in co-pending application Ser. No. 626,665, filed Oct. 29, 1975, and assigned to the assignee herein. As described more fully hereinafter, the signal from control 37 determines the location on the screen at which the selected image is displayed.

Operation and use of the system of FIG. 1 and therein the method of the invention can be described briefly. Data for each image of object 22 is stored in ROM 21 by storing a 1 at each location where the beam of display tube 12 is to be turned on and storing a 0 at each location where the beam is to be turned off. Image selection counter 26 selects the images in the order 1-16 during successive frames of the picture, and the data for each image is scanned continuously during the frame for which it is selected by the address signal from counters 17, 18.

AND gate 36 controls the passage of the data from ROM 21 to video adder 11 in accordance with the signal from image position control 37. Thus, even though the data is read from the ROM continuously, it is displayed on the screen only at the location determined by the position control. When images 1-16 of arrow 22 are displayed in that order during successive frames, the arrow appears to rotate in a clockwise direction at the location determined by the position control.

Figure 2:
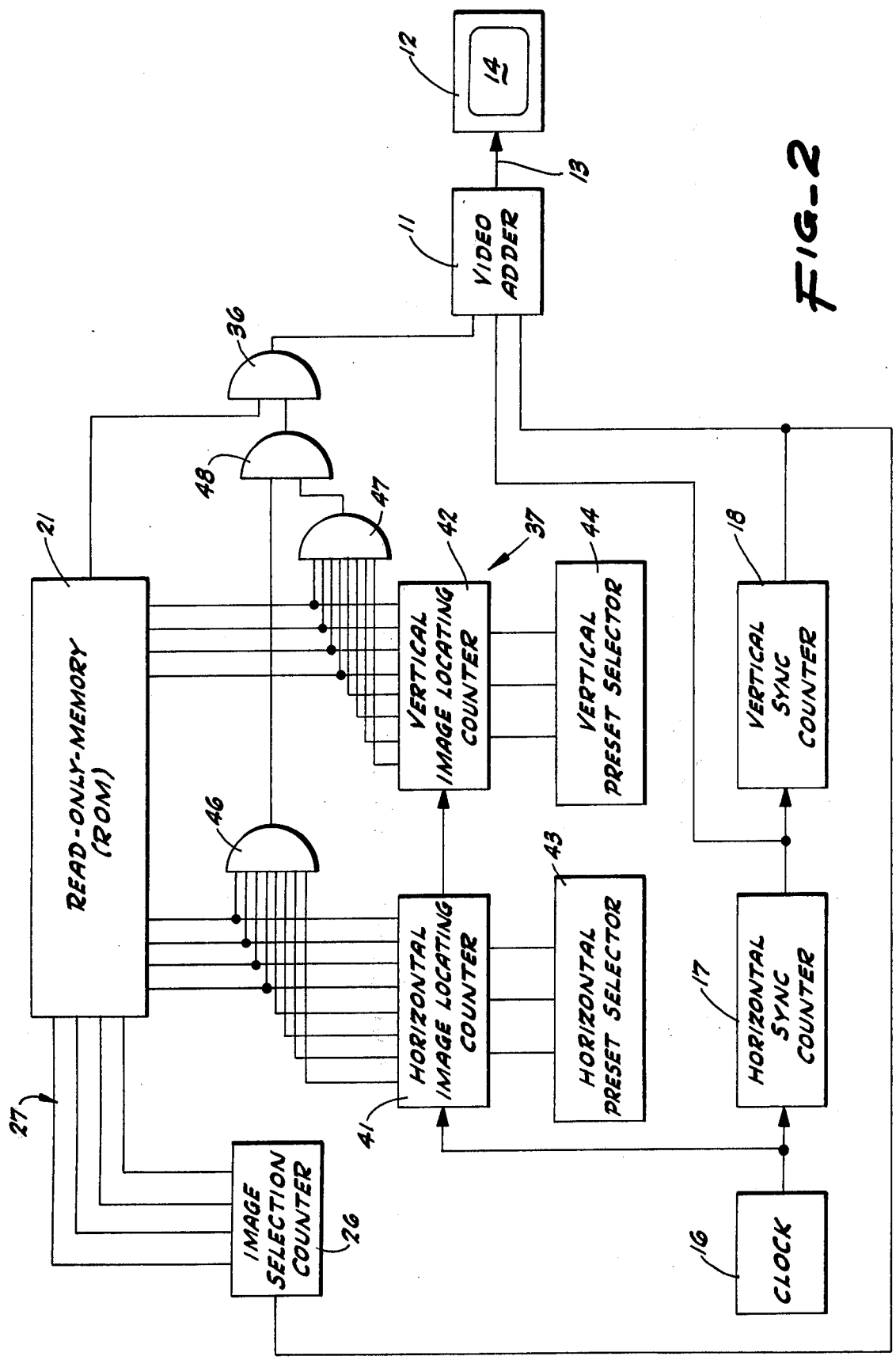
FIG. 2 is a block diagram of another embodiment of a system for producing an animated image of a moving object on a video display screen.

While the embodiments heretofore described are particularly suitable for generating an animated image of an object at a fixed location on the screen, the system illustrated in FIG. 2 is suitable for generating an animated image of a moving object. This embodiment is generally similar to the embodiment of FIG. 1, and like reference numerals are used to designate corresponding elements. In the embodiment of FIG. 2, however, address signals for reading the image data out of ROM 21 are obtained from the motion counters of the image position control, rather than the horizontal and vertical sync counters.

In the embodiment of FIG. 2, image position control 37 is of the type described in U.S. Pat. No. 3,793,483, issued Feb. 19, 1974 to the assignee herein. Briefly, this control includes a horizontal image locating counter 41 and a vertical image locating counter 42 which can be preset to produce horizontal and/or vertical displacement of the image on the screen with respect to the locus defined by the counts in horizontal sync counter 17 and vertical sync counter 18. Counters 41, 42 are conventional 8-bit, presettable binary counters, and clock pulses from clock 16 are applied to the clock input of counter 41. The overflow output of counter 41 is connected to the clock input of counter 42. Preset signals are applied to the preset inputs of counters 41, 42 by preset selectors 43, 44 which can be manually or electronically controlled, as desired. In order to permit displacement of the image in both positive and negative directions, counters 17, 18 are preset to a count intermediate the highest and lowest counts to which counters 41, 42 can be preset.

The outputs of image locating counters 41, 42 are connected to the inputs of AND gates 46, 47, respectively, and the outputs of these gates are connected to the inputs of an AND gate 48. The output of AND gate 48 is connected to the second input of AND gate 36. The four least significant digits of the outputs of counters 41, 42 are connected to the address inputs of ROM 21.

Operation and use of the embodiment of FIG. 2 is generally similar to that of FIG. 1. However, in this embodiment, the selected images are displayed at different locations on the screen in successive frames, as determined by preset selectors 43, 44. When images 1-16 of arrow 22 are displayed in their predetermined order at different locations during successive frames, the arrows will appear to move across the screen as it rotates.

While the embodiment of FIG. 2 is illustrated in connection with an image position control of the type described in U.S. Pat. No. 3,793,483, the invention can be employed with other types of position controls, e.g. a system utilizing a comparator in conjunction with sync counters and position or motion counters, as described in copending application Ser. No. 626,665, filed Oct. 29, 1975, and assigned to the assignee herein. In such a system, the address signals for the ROM would be taken from the position or motion counters, as in the embodiment illustrated.

The invention has a number of important features and advantages. By storing data for successive images of an object in a ROM, animated images of the objects are produced without the use of complex computing circuits. As noted above, the invention is particularly suitable for use in video amusement games in which images of one or more objects are caused to move across a display screen under the control of an operator or internally generated control signals.

It is apparent from the foregoing that a new and improved animated video image display screen and method have been provided. While only certain presently preferred embodiments have been described, as will be apparent to those familiar with the art, certain changes and modifications can be made without departing from the scope of the invention as defined by the following claims.

What is claimed is:

1. In a method of producing an animated image of a moving object on a video display screen, the steps of: storing digital data for a plurality of progressively different images of the object at individually addressable locations in a randomly accessible memory applying address signals to the memory to read the data for the images out of the memory, and displaying the images corresponding to the data from the memory at predetermined locations on the screen.

2. The method of claim 1 wherein the data for successive ones of the images is read out of the memory in the predetermined order.

3. The method of claim 1 wherein the screen is scanned by an electron beam moving at a predetermined rate and the data is read out of the memory in accordance with said rate.

4. The method of claim 1 wherein the images are displayed at successive locations on the screen.

5. In a system for producing an animated image of a moving object on a video display screen: randomly accessible memory means having data for a plurality of progressively different images of the object stored at individually addressable locations thereof, means for applying address signals to the memory means to read out the data for successive ones of the images, and means responsive to the data from the memory means for causing the images corresponding to said data to be displayed successively at predetermined locations on the screen.

6. The system of claim 5 wherein the memory means comprises a read only memory.

7. The system of claim 5 wherein the means responsive to the data comprises a coincidence gate responsive to conjoint receipt of said data and a signal corresponding to the location on the screen at which each of the images is to be displayed.

8. In a method of producing an animated image of a moving object on a video display screen scanned in successive frames in response to position signals, the steps of: storing digital data for a plurality of progressively different images of the object at individually addressable locations in a randomly accessible memory, applying image selection signals to the memory to select the data for different ones of the images during successive frames of the display, providing address signals having a predetermined relationship to the position signals, applying the address signals to the memory to read out the selected data, combining the data from the memory with data corresponding to the location on the screen at which the image for each frame is to be displayed, and displaying the image for each frame on the screen in accordance with the combined image and location data.

9. In a system for producing an animated image of a moving object on a video display screen scanned in successive frames in response to position signals: randomly accessible memory means for storing digital data for a plurality of progressively different images of the object at individually addressable locations thereof, means for applying image selection signals to the memory to select the data for different ones of the images during successive frames of the display, means for reading the selected data out of the memory means in response to the position signals, means for combining the data from the memory means with the data corresponding to the location on the screen at which the image for each frame is to be displayed, and means responsive to the combined image and location data for displaying the image for each frame on the screen.

10. The system of claim 9 wherein the memory means comprises a read only memory.

11. The system of claim 9 wherein the position signals are pulses generated at a predetermined rate relative to the scanning of the screen and the means for applying image selection signals comprises a counter responsive to said pulses.

12. The system of claim 9 wherein the means for combining the data comprises a coincidence gate.

13. In a system for producing an animated image of an object on the screen of a video display scanned in raster fashion by a beam: a source of clock pulses, a randomly accessible digitial memory having data for a plurality of images of the object stored at individually addressable locations thereof, counting means responsive to the clock pulses for delivering sync pulses to the display to synchronize the raster and address signals to the memory to read out the data for the images, and gating means for selectively passing the output data from the memory to the display in accordance with the position of the beam on the screen.

14. The system of claim 13 wherein the memory comprises a read only memory.

15. The system of claim 13 wherein the counting means comprises first and second counters for delivering horizontal and vertical sync pulses in response to predetermined numbers of clock pulses, said counters having weighted output lines connected to the address inputs of the memory whereby the address signals correspond to the number of pulses counted.

16. The system of claim 13 wherein the counting means comprises a first counter for providing the sync pulses and a second counter having weighted output lines connected to the address inputs of the memory and to the gating means.

17. The system of claim 16 further including means for presetting the second counter to a predetermined level.

* * * * *